March 12, 1957 S. H. VOLLERTZEN ET AL 2,785,016
FLEXIBLE NOZZLES
Filed Sept. 26, 1955

INVENTORS
SVEN HERMAN VOLLERTZEN
& WILLIAM W. HECKETHORN
BY
ATTORNEY

United States Patent Office 2,785,016
Patented Mar. 12, 1957

2,785,016

FLEXIBLE NOZZLES

Sven Herman Vollertzen and William W. Heckethorn, Littleton, Colo., assignors to Heckethorn Manufacturing & Supply Co., Littleton, Colo.

Application September 26, 1955, Serial No. 536,557

4 Claims. (Cl. 299—149)

This invention relates to a flexible hose nozzle and has for its principal object the provision of a flexible nozzle of the type which when flexed will open and close a control valve; to provide a nozzle of this character which can be economically manufactured by simply assembling premolded or preformed parts and to provide a nozzle that will be exceedingly long-lived and efficient in operation.

Another object of the invention is to provide an integral, preformed, flexible portion for a nozzle of this type which will serve not only as the nozzle jet but also as: a seat for a screen; a seat for a control valve; a sealing gasket for sealing the assembly to a hose; and as a retaining means for retaining the control valve in place.

A further object of the invention is to so construct the device that the movable valve portion thereof will be a single unitary piece so as to eliminate the labor usually required to assemble the valve portion.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
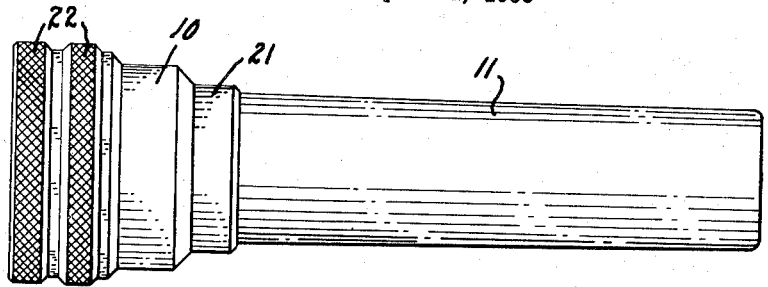
Fig. 1 is a side view of the improved flexible nozzle.
Figure 2:
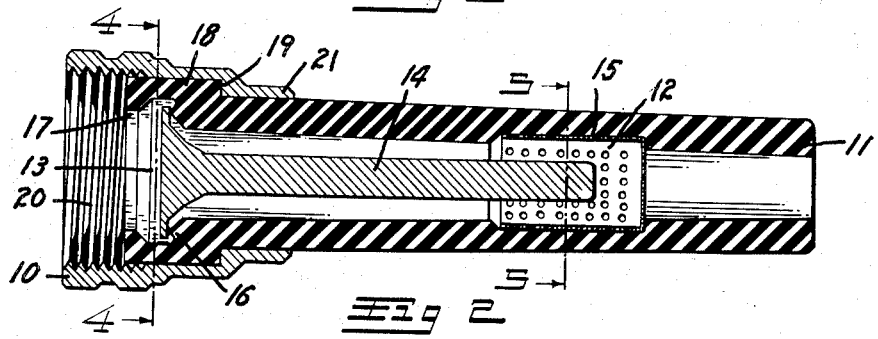
Fig. 2 is a longitudinal medial section therethrough, illustrating the nozzle in the straight or closed position.
Figure 4:
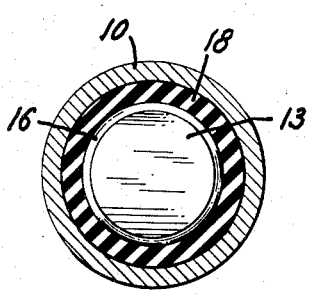
Figure 5:
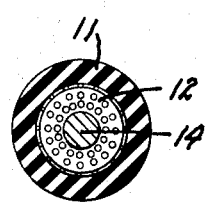
Figure 6:
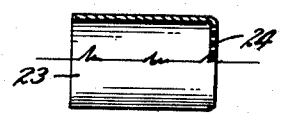
Figure 7:
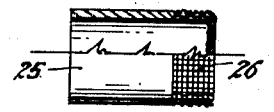

Figs. 4 and 5 are cross sections through the improved nozzle, taken on the lines 4—4 and 5—5, Fig. 2, respectively; and Figs. 6 and 7 are detail side views, partially in section, illustrating alternate forms of screens which may be used in the improved valve-containing nozzle.

The improved flexible valve-containing nozzles consists of four preformed parts which can be quickly and easily assembled without the use of any special tools to form the complete self-contained and self-retained nozzle. The four preformed parts comprise a female coupling portion 10, a flexible tubular nozzle portion 11, a stream controlling screen 12, and a combined unitary molded, forged or turned disc valve 13 and valve stem 14.

The tubular nozzle portion 11 may be molded from neoprene, rubber, flexible plastic or other suitable, flexible resilient material and is formed with an enlarged cylindrical internal wall cavity 15 of a diameter to snugly receive and hold the controlling screen 12. The nozzle portion is externally tapered so as to decrease in diameter toward the discharge extremity and is provided with an enlarged cylindrical intake extremity 18 which forms a shoulder 19 for retaining the nozzle portion 11 in place in the coupling 10. The enlarged intake extremity 18 contains an annular, projecting transversely-positioned valve seat 16 adapted to receive the disc valve 13 and seal the latter to the nozzle portion and is provided with an inwardly extending valve-retaining lip 17 at its rear or intake extremity. The lip 17 is of smaller internal diameter than the exterior diameter of the disc valve 13 and is spaced from the valve seat so as to act to retain the disc valve in place adjacent the valve seat 16.

The coupling portion 10 may be provided with any suitable external knurling 22 to facilitate gripping in the hand for connecting and disconnecting purposes and is provided with internal hose threads 20 at its rear or intake extremity and with a reduced sleeve portion 21 at its other extremity which snugly encloses the nozzle portion 11 and which forms an internal shoulder in the coupling. The internal diameter of the coupling is such as to snugly receive the enlarged cylindrical intake extremity 18 of the nozzle portion 11. The threads 20 extend forwardly about the enlarged extremity 18 of the nozzle portion so that when the coupling is threaded onto a male hose coupling, the latter can pass forwarly sufficiently far to compress and seal against the extremity 18 of the nozzle portion 11.

Figure 3:
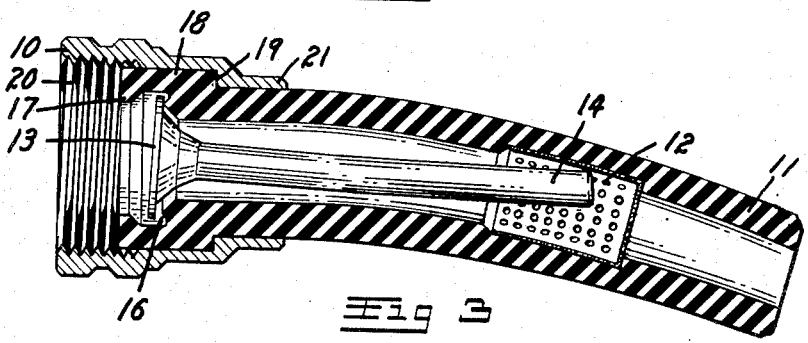
Fig. 3 is a similar longitudinal section illustrating the nozzle in the flexed or open position.

The open end of the stream controlling screen 12 is directed toward the coupling 10 and loosely encloses the extremity of the valve stem 14. The screen 12 may be stamped from perforated sheet material into a cup-shape so that it will be perforated throughout its cylindrical wall and throughout its closed end, as shown in Figs. 2 and 3. Other ways of forming the screen are illustrated in Figs. 6 and 7. In Fig. 6, the screen is illustrated formed from bar stock with a tubular sleeve portion 23 and a perforated end wall 24. In Fig. 6, the screen is illustrated formed from tubing with a tubing section 25 reduced in diameter at one extremity to receive a cap portion 26 formed from fine mesh wire cloth. When in place in the nozzle portion 11, the wall cavity 15 retains the cap portion 26 in place on the tubing section 25.

The improved flexible valve is assembled by simply forcing the screen 12 or one of the screens of Figs. 6 or 7 into the discharge extremity of the nozzle portion 11, the latter being stretched until the screen reaches its seat 15 therein. The valve stem 14 is now inserted in the intake extremity of the nozzle portion 11 and the disc valve 13 is forced past the retaining lip 17 by flexing the latter. The above assembly is now forced into and through the coupling 10 until the shoulder 19 on the nozzle portion 11 seats against the shoulder in the coupling 10. As the two shoulders approach each other, the gradually increasing diameter of the nozzle portion 11 will cause it to resiliently wedge and seal within the sleeve portion 21. The complete nozzle is now ready for use and when screwed upon a male hose coupling, a leak-proof seat will be provided against the enlarged rear extremity 18 of the nozzle portion 11.

The above construction is ideal for plastic molding, that is the coupling 10 and the valve 13—14 can be quickly and easily molded as units from plastic. The nozzle portion 11 can be quickly and easily molded from neoprene or rubber and the screen 12 can be molded or formed by a simple stamping operation. The valve assembly can be formed from a length of brass rod upset or forged at one extremity to form the disc valve 13.

The screen acts to protect the interior of the nozzle portion from wear occasioned by the extremity of the valve stem and also acts to smooth the stream issuing from the nozzle portion to prevent spraying and splattering. The pressure of the fluid in the hose maintains the disc valve against its seat until the nozzle portion is flexed to tilt the valve from its seat. Since the nozzle portion is resilient, it will always return to the straight position when the flexing bias is released to allow the disc valve to return to its seat.

While a specific form of the improvement has been described and illustrated herein, it is to be understood that the same may be varied, within the scope of the appended claims, without departing from the spirit of the invention.

Having thus described the invention what is claimed and desired secured by Letters Patent is:

1. A flexible nozzle comprising: a coupling; internal hose threads formed in the rear extremity of said coupling; a sleeve formed on the forward extremity of said coupling, the inner diameter of said sleeve being less than the inner diameter of said threads; a tubular resilient, flexible nozzle portion extending through and forwardly from said sleeve; a resilient enlarged integrally formed extremity on the rear of said nozzle portion, said enlarged extremity being positioned within said coupling; an annular resilient valve seat within and completely surrounded by said enlarged extremity, said seat being integral with said nozzle portion; a disc valve positioned to seal against said valve seat; and a stem formed on said disc valve and extending forwardly into said flexible nozzle portion.

2. A flexible nozzle comprising: a coupling; internal hose threads formed in the rear extremity of said coupling; a sleeve formed on the forward extremity of said coupling, the inner diameter of said sleeve being less than the inner diameter of said threads; a tubular resilient, flexible nozzle portion extending through and forwardly from said sleeve; a resilient enlarged integrally formed extremity on the rear of said nozzle portion, said enlarged extremity being positioned within said coupling; an annular resilient valve seat within and completely surrounded by said enlarged extremity, said seat being integral with said nozzle portion; a disc valve positioned to seal against said valve seat; a stem formed on said disc valve and extending forwarly into said flexible nozzle portion; and an annular, inwardly projecting resilient lip formed integrally with the nozzle portion and with the enlarged extremity thereon, said lip being positioned in the rear extremity of the enlarged extremity of said nozzle portion rearwardly of said disc valve, the inner diameter of said annular lip being less than the external diameter of said disc valve so that said lip must be fixed to insert said valve and so that said lip will expand after flexure to retain said valve in place in said enlarged extremity.

3. A flexible nozzle comprising: a coupling; internal hose threads formed in the rear extremity of said coupling; a sleeve formed on the forward extremity of said coupling, the inner diameter of said sleeve being less than the inner diameter of said threads; a tubular resilient, flexible nozzle portion extending through and forwardly from said sleeve; a resilient enlarged integrally formed extremity on the rear of said nozzle portion, said enlarged extremity being positioned within said coupling; an annular resilient valve seat within and completely surrounded by said enlarged extremity, said seat being integral with said nozzle portion; a disc valve positioned to seal against said valve seat; a stem formed on said disc valve and extending forwardly into said flexible nozzle portion; and an annular, inwardly projecting resilient lip formed integrally with the nozzle portion and with the enlarged extremity thereon, said lip being positioned in the rear extremity of the enlarged extremity of said nozzle portion rearwardly of said disc valve, the inner diameter of said annular lip being less than the external diameter of said disc valve so that said lip must be fixed to insert said valve and so that said lip will expand after flexure to retain said valve in place in said enlarged extremity, said lip being surrounded by said hose threads to provide a resilient seal against a male hose coupling when the latter is threaded into said coupling.

4. A flexible nozzle comprising: a coupling; internal hose threads formed in the rear extremity of said coupling; a sleeve formed on the forward extremity of said coupling, the inner diameter of said sleeve being less than the diameter of said threads; a tubular flexible nozzle portion extending through and forwardly from said sleeve; an integrally formed enlarged rear extremity formed on said nozzle portion and positioned in said coupling; an integrally formed annular valve seat formed in said enlarged extremity; a disc valve positioned to seal against said valve seat; a stem formed on said disc valve and extending forwardly into said flexible nozzle portion; a rigid tubular section positioned in said nozzle portion so as to surround and project forwardly beyond said valve stem; and a perforated screen closing the forward extremity of said tubular section.

References Cited in the file of this patent

UNITED STATES PATENTS

| 202,700 | Bullock | Apr. 23, 1878 |
| 2,149,584 | Davis | Mar. 7, 1939 |

FOREIGN PATENTS

| 82,763 | Germany | Sept. 11, 1895 |